United States Patent [19]
Graves et al.

[11] Patent Number: 6,115,162
[45] Date of Patent: Sep. 5, 2000

[54] DOUBLE SIDE BAND, CARRIER SUPPRESSED MODULATED COHERENT FIBER OPTIC LINK

[75] Inventors: David Graves, Palm Bay; Greg Daugherty, Melbourne; Robert Montgomery, Indialantic, all of Fla.

[73] Assignee: Harris Corporation, Melbourne, Fla.

[21] Appl. No.: 08/370,653

[22] Filed: Jan. 10, 1995

[51] Int. Cl.[7] .................................................. H04B 10/12
[52] U.S. Cl. ........................ 359/173; 359/145; 359/191; 359/195
[58] Field of Search .................... 359/145–146, 359/162, 173, 181–182, 188, 191, 195; 379/56

[56] References Cited

U.S. PATENT DOCUMENTS

| | | | |
|---|---|---|---|
| 5,373,383 | 12/1994 | LaGasse | 359/182 |
| 5,424,863 | 6/1995 | Gertel | 359/173 |
| 5,526,158 | 6/1996 | Lembo | 359/191 |
| 5,532,857 | 7/1996 | Gertel et al. | 359/154 |

FOREIGN PATENT DOCUMENTS 0466182  1/1992  European Pat. Off. ............... 359/181

OTHER PUBLICATIONS

Kwong et al., "Coherent Subcarrier Fiber–Optic Communication Systems With Phase–Noise Cancellation" IEEE Transactions on Communications, vol. 42, No. 6, Jun. 1994.

*Primary Examiner*—Kinfe-Michael Negash
*Attorney, Agent, or Firm*—Rogers & Killeen

[57] ABSTRACT

A system for conveying a signal by optical fiber may include a converter for converting a radio frequency signal to an optical frequency signal, the converter having an interferometer modulator for providing a carrier suppressed optical frequency signal having a sideband modulated by the radio frequency signal, an optical amplifier for amplifying the modulated sideband before transmission on an optical fiber by an amount that is greater than or approximates the transmission loss in the system, a local oscillator, a coupler, and detector for converting (superheterodyning) the modulated sideband from the optical fiber to a predetermined intermediate radio frequency.

10 Claims, 7 Drawing Sheets

DOUBLE SIDE BAND, CARRIER SUPPRESSED MODULATED COHERENT FIBER OPTIC LINK

BACKGROUND OF THE INVENTION

The present invention relates to the transmission of high frequency signals on optical fibers, and more particularly to conversion of radio frequency (RF) signals to light wave frequency signals, and back again, so that the signals can be carried by an optical fiber for subsequent reception at an optical detector.

Radio frequency signals may be collected at an antenna site that may be remote from a receiver, and the received signal must be conveyed from the antenna to the receiver. Typically, a received microwave signal is conveyed to the receiver in a coaxial cable or waveguide. For example, a ship may have an antenna platform where signals are collected on multiple antennas and routed in separate waveguides to receivers several decks below. However, metal coaxial cables and waveguides may be heavy, bulky and may distort the signals because they cannot carry the requisite bandwidth, and a substitute for the waveguides and cables has long been sought.

One suggested solution is to use optical fiber to carry the received signals to the receivers. Optical fiber is light weight, not bulky, and has more than adequate bandwidth. By way of example, and with reference to FIG. 1, a prior art system 10 may include a modulator 12 for modulating a received RF signal on an optical frequency carrier, such as from a laser 14. The modulated carrier signal may be conveyed via optical fiber 16 to a photodetector/demodulator 18 that demodulates the signal, generating the original RF signal for reception by a receiver 20.

Attempts to boost the modulated optical frequency carrier signal to provide sufficient gain to overcome transmission losses have not been successful because the carrier component of the signals is generally so large relative to the modulated signal that amplification sufficient for the modulated signal will cause the carrier to saturate an amplifier.

Further, as is apparent from FIG. 1, the photodetector/demodulator 18 must have a bandwidth large enough for all received signals (e.g., an entire transmission band). The compromises in performance attendant with this large bandwidth requirement make a narrower bandwidth desirable, although a suitable solution has not been found heretofore.

Accordingly, it is an object of the present invention to provide a novel system and method for converting RF signals to optical frequency signals that obviates the problems of the prior art.

It is another object of the present invention to provide a novel system and method for conveying a signal by optical fiber that has been received on a radio frequency in which the signal is modulated to optical frequency and subsequently transmitted with the carrier suppressed so that the optical frequency signal can be amplified before further transmission through an optical fiber.

It is yet another object of the present invention to provide a novel system and method for conveying a signal by optical fiber that has been received on a radio frequency in which the signal is modulated on the sideband of an optical frequency carrier in which the carrier has been suppressed.

It is a further object of the present invention to provide a novel system and method for conveying a radio frequency signal by optical fiber in which a Mach-Zehnder interferometer modulator suppresses the optical frequency carrier and modulates the signal on the double sidebands of the optical frequency carrier.

It is yet a further object of the present invention to provide a novel system and method for conveying a signal by optical fiber in which the optical signal is converted to an intermediate frequency before being demodulated.

It is still a further object of the present invention to provide a novel system and method for conveying a signal by optical fiber in which the optical signal is converted to an intermediate radio frequency by mixing with a tunable laser local oscillator.

It is an additional object of the present invention to provide a novel system and method for conveying a signal by optical fiber in which an optical bandpass filter suppresses an image of the intermediate radio frequency in the double sidebands conveyed by the optical fiber.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
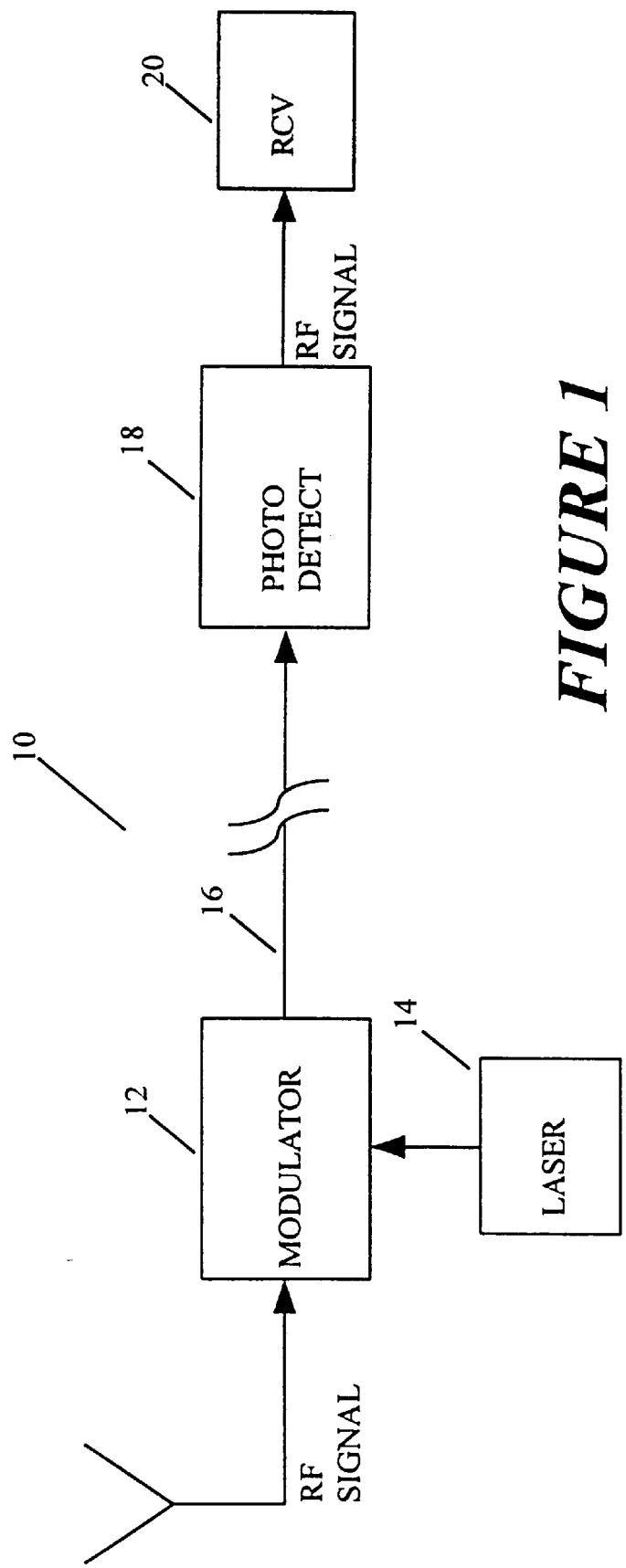
FIG. 1 is a block diagram of a system of the prior art.
Figure 2:
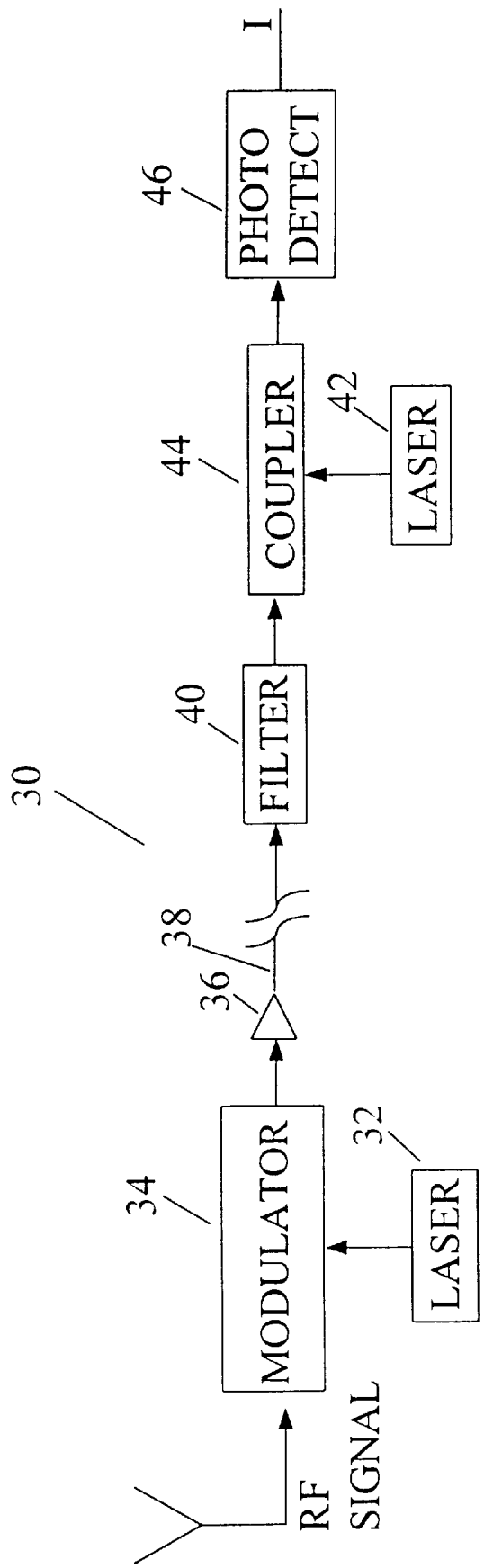
FIG. 2 is a block diagram of an embodiment of the system of the present invention.

With reference now to FIG. 2, an embodiment of a system 30 of the present invention for conveying a signal by optical fiber that has been received on a radio frequency may include, a laser 32 for providing an optical frequency carrier, an interferometer modulator 34 for modulating the received RF signal on one or both of the sidebands of the optical frequency carrier from the laser 32 and for suppressing the carrier of the optical frequency carrier, an optical amplifier 36 for amplifying the modulated sideband(s) before transmission on an optical fiber 38, desirably by an amount that may exceed or approximate the amount of transmission loss in the optical fiber, an optical bandpass filter 40 for suppressing an image of an intermediate radio frequency (discussed below) in the modulated sideband(s), a laser local oscillator 42, and a coupler 44 for combining the filtered signal with the optical frequency from the laser local oscillator 42 for conversion to a predetermined intermediate radio frequency by photodetector 46.

In the operation of the system, the received RF signal of any frequency, including microwave frequencies in the range 100 MHz to 20 GHz, may be translated to an optical frequency, amplified to overcome anticipated transmission losses in the optical fiber, filtered to isolate the frequency band of interest, and translated back to a fixed intermediate frequency using a local oscillator. By way of further explanation, the system may be viewed as an optical frequency superheterodyne that can provide several advantages: the suppressed carrier techniques made available in part by the use of coherent (laser) optics allows for more effective use of optical amplifiers; minimizes system noise figure in high loss cables; optical frequency superheterodyne transmission translates all received frequencies to a predetermined intermediate frequency so that the bandwidth of the photodetector may be reduced to that needed to receive a particular band and thereby allowing the receiver to use a large area, high dynamic range photodetector; the coherent optics may include optical phase shifters that open up additional options for processing such as beam forming and null steering; and the system adapts easily to FDM applications.

Figure 3:
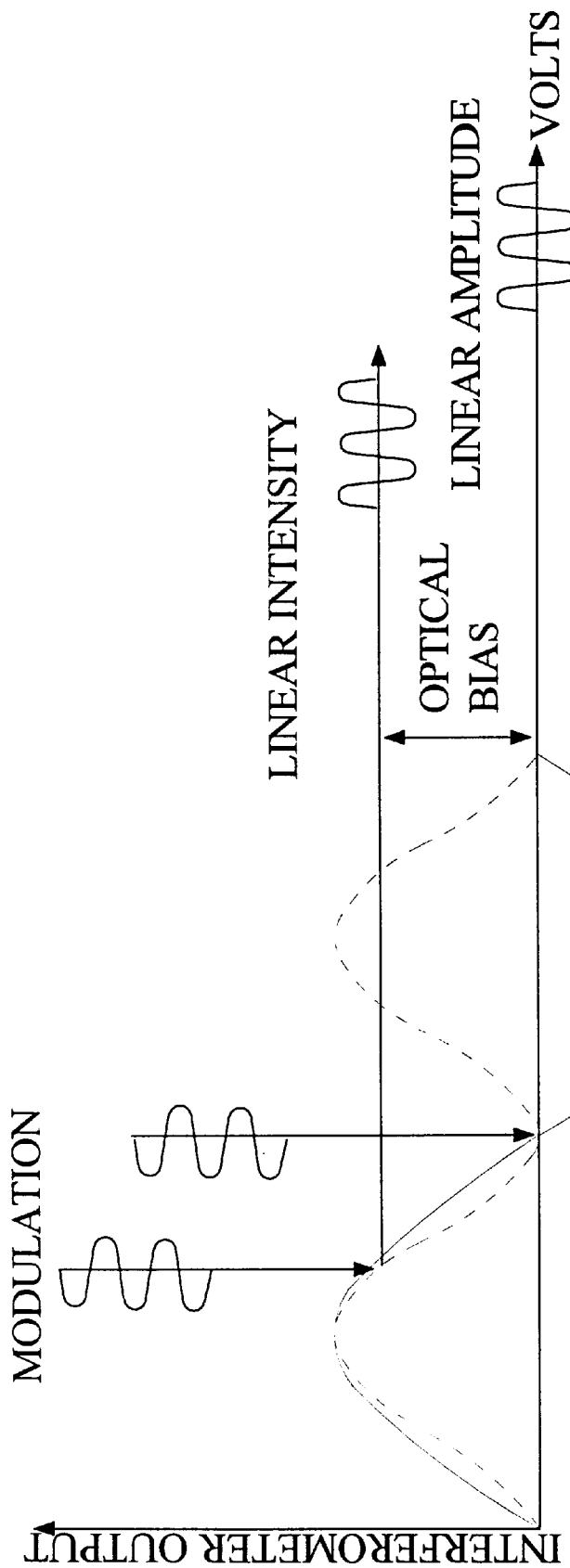
FIG. 3 is a plot of modulator output versus voltage illustrating carrier suppression.

A double sideband, suppressed carrier modulation, such as depicted in FIG. 3, is preferred for the translation to light frequency because of its simplicity. Single sideband transmission may also be used, although the implementation of single sideband modulation technique requires a 90 degree phase shift across the microwave band being transmitted. This is relatively simple for narrowband systems but difficult when fractional bandwidths are large. Regardless of the modulation method used, some degree of carrier suppression is preferred so that the optical signal can be amplified prior to encountering any transmission losses. For example, if the carrier component is suppressed by 20 dB then the signal can be amplified by 20–30 dB before it suffers any losses. This can be an important advantage in signal distribution systems where various splitting, switching and other distribution losses occur.

Figure 4:
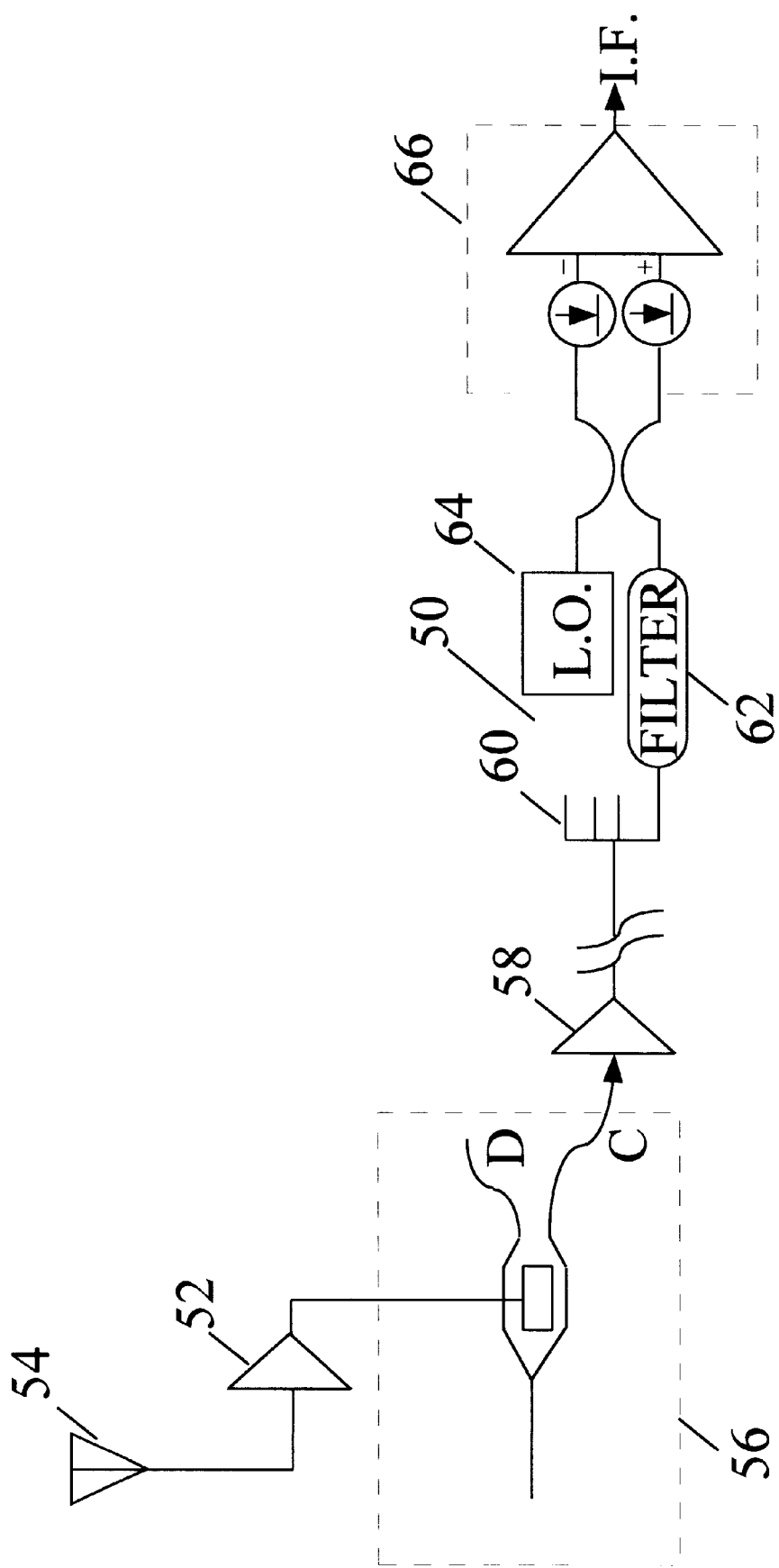
FIG. 4 is a simplified circuit diagram of an embodiment of the present invention.

With reference now to FIG. 4, a preferred embodiment 50 may include an electronic preamplifier 52 for boosting RF signals received at the antenna 54 and providing the signals to a Mach-Zehnder interferometer modulator 56. The modulator 56 (further discussed below) provides two outputs C and D, with C containing the modulated sidebands and D containing the optical (laser) carrier that is not used. The content of C and D may be reversed with appropriate bias voltage charge to the interferometer. The modulated sidebands are provided to an optical amplifier 58 where they are amplified to overcome anticipated transmission losses, and thereafter routed through a signal distribution network 60, one portion of which is illustrated in FIG. 4. An optical preselection filter 62, whose operation will be described below, limits the bandwidth of the double sidebands to a range related to the fixed intermediate radio frequency. The output from the filter 62 and from a laser local oscillator 64 are provided to a Mach-Zehnder image filter 66 (discussed below). The local oscillator 64 may be tuned to a frequency that is independent of the fixed input optical frequency.

Figure 5:
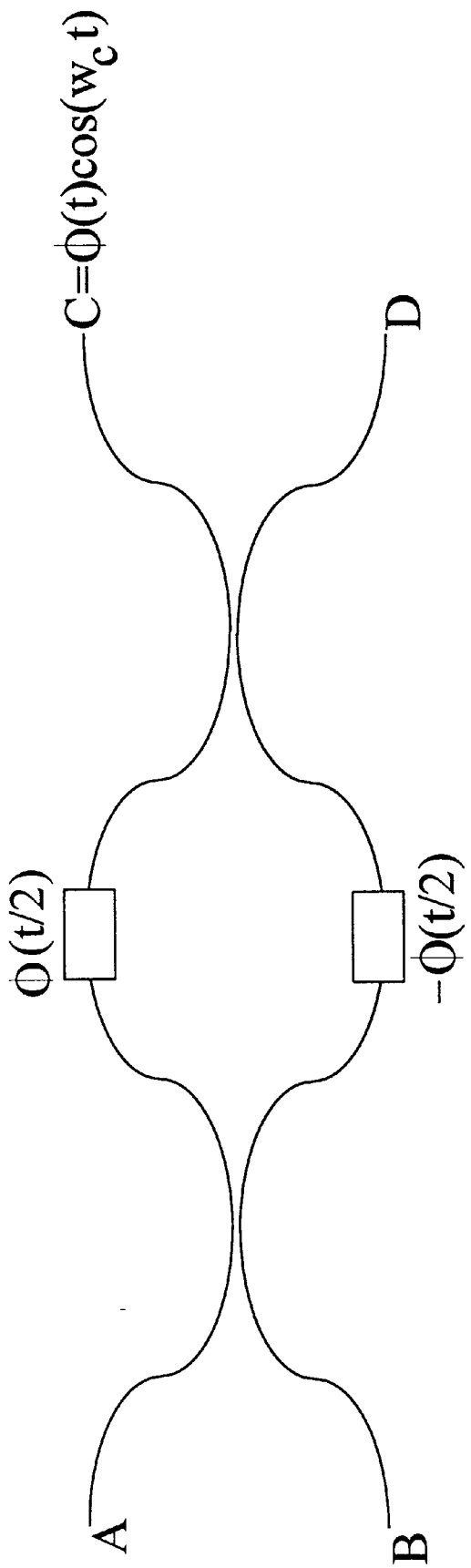
FIG. 5 is a pictorial representation of operation of a Mach-Zehnder double sideband suppressed carrier modulator.

The double sideband suppressed carrier modulation may be obtained by operating the Mach-Zehnder interferometer modulator 56 at a bias that shifts the relative phases of the interferometer an additional 90° from the typical half power bias point. Carrier suppression may be obtained by operating the Mach-Zehnder modulator 56 at this voltage bias. Under this condition the carrier is nulled at one output port and the sidebands are nulled at the other. Consider two 3 dB directional couplers in a balanced bridge configuration as illustrated in FIG. 5. The input ports are A and B and the output ports are C and D. Let a carrier $\cos(\omega_c t)$ be input to port A. The output of the first coupler will be −3 dB with 0 degrees in the upper arm and −3 dB with 90 degrees in the lower arm. After passing through the second coupler the signal will exit with no signal at port C and all the signal power at port D. If, in addition to a voltage bias, a signal is applied as $\phi(t)$ to the modulator, the generated sidebands will be present at the port in which the carrier is suppressed, port C in this example. This is so because an additional 90° bias shift is incurred in the sidebands, as can be derived from double sideband modulation theory. In the system herein, port C may be the signal port and port D may be the carrier output port.

Where a phase modulation of $\phi(t)/2$ is applied in the upper arm of the bridge and $-\phi(t)/2$ in the lower arm, the field strength output from port C is $C=\sin(\phi(t))\cos(\omega_c t)$ and the output from port D is $D=\cos(\phi(t))\sin(\omega_c t)$. If $\phi(t)$ is small, then $\sin(\phi(t))=\phi(t)$ and the output from C is double sideband suppressed carrier modulation; the carrier exits port D ($\cos(\phi(t))=1$) and the modulated sidebands exit port C. The sideband power at port C may be fed to the optical amplifier 58, such as shown in FIG. 4.

Figure 6:
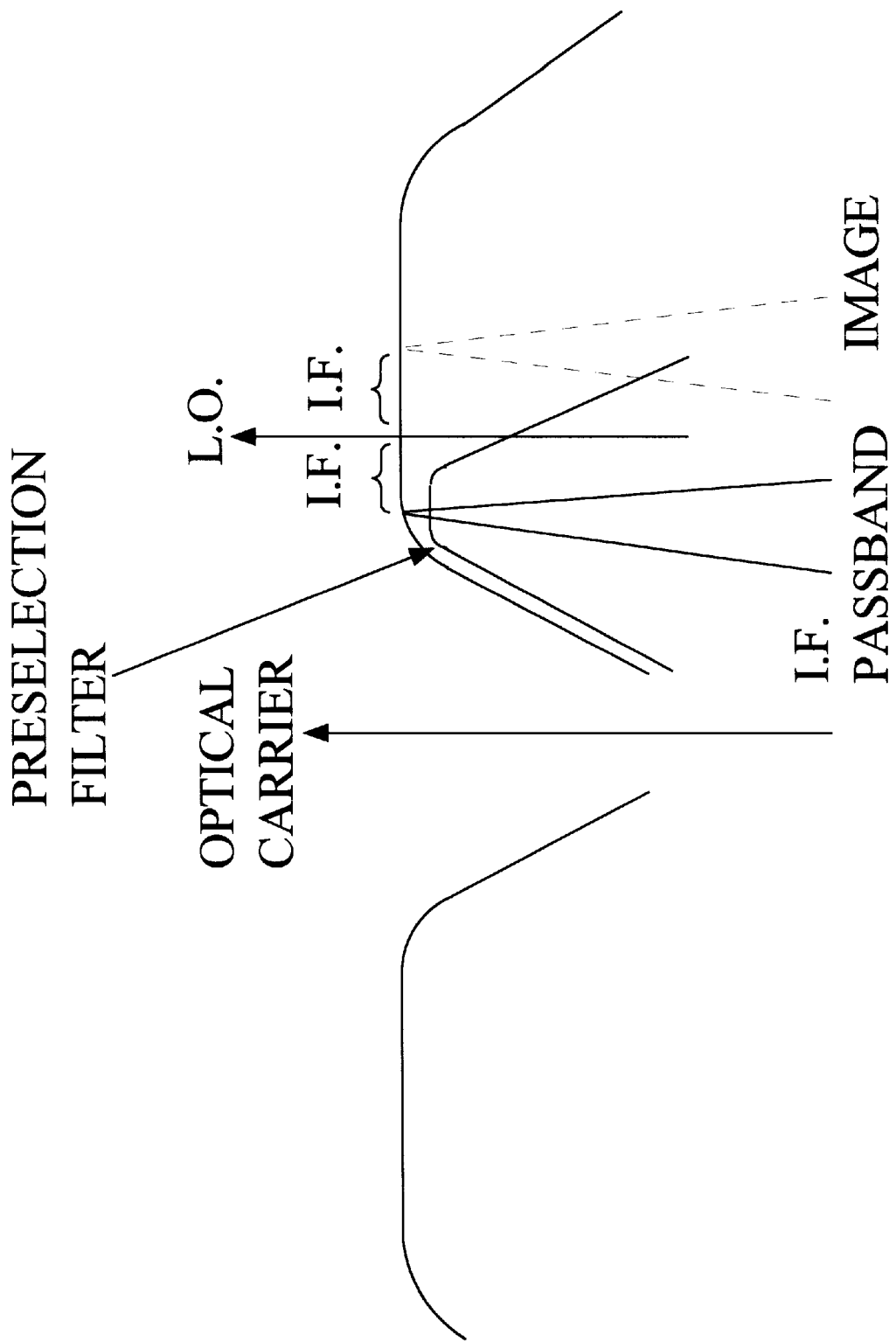
FIG. 6 is a pictorial representation of operation of the optical filter.

In order to achieve the desired operation the local oscillator 64 and the filter 62 desirably track together as the radio is tuned, and to this end the laser local oscillator 64 may be agile. In a preferred embodiment, the optical preselection filter 62 suppresses the image component of the intermediate radio frequency. By way of example, the optical spectrums of the signal and optical local oscillator are shown in FIG. 6, in which the locations of the intermediate frequency passband and the preselection filter for removing the image are also shown schematically. Conventional techniques may be used for image suppression.

Figure 7:
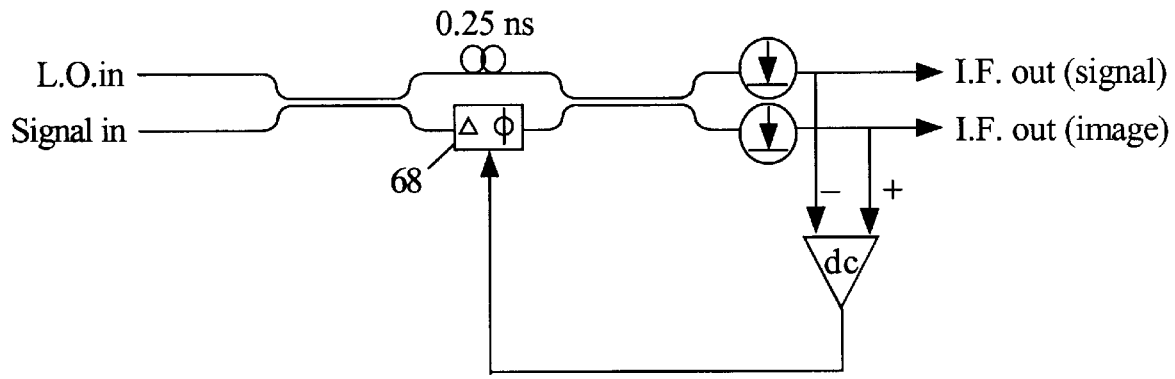
FIG. 7 is a simplified circuit diagram of a Mach-Zehnder optical filter.
Figure 8:
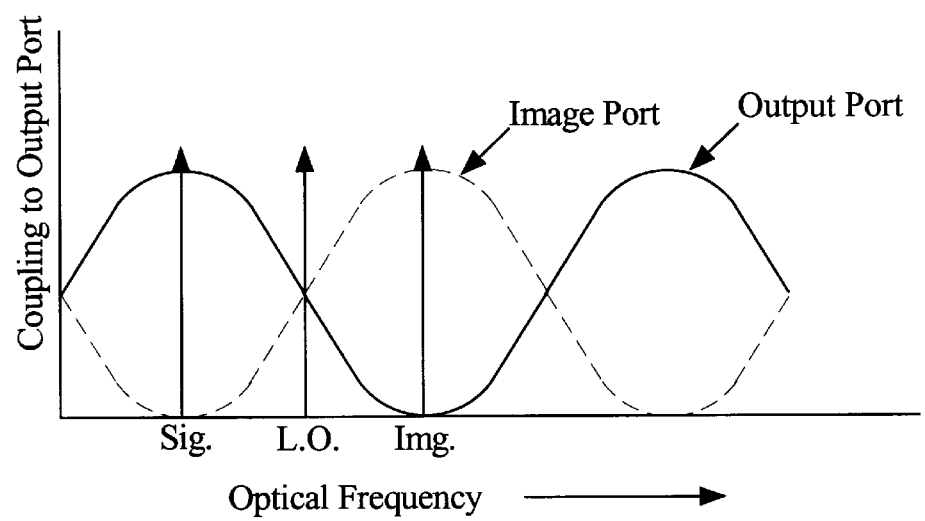
FIG. 8 is a plot of filter output versus optical frequency.

The image rejection filter 66 may comprise an unequal path Mach-Zehnder interferometer modulator, such as illustrated in FIG. 7. In this arrangement the local oscillator 64 is split equally between the two output ports, and a closed loop feedback to a phase modulator 68 keeps the output ports balanced at the strong local oscillator frequency (in effect, a phase locked loop). Optical signals at frequencies that are the intermediate frequency below the local oscillator frequency will exit at the top port. Signals at frequencies that are the intermediate frequency above the local oscillator will exit at the bottom port. The signal and local oscillator output power at the top port is illustrated in FIG. 8. This method has the advantage that it is simple. The disadvantage is that strong signals in the multiple pass bands could act effectively as local oscillators to produce mixing products at the intermediate frequency. Such spurious terms will be suppressed relative to the desired signal by the ratio of the strength of the signal acting as local oscillator to the actual local oscillator. In the event this is not adequate a more complex filtering scheme and/or a balanced mixer may be used. A balanced mixer suppresses the second order terms through the symmetric properties of the mixer channels.

It has been found that the coherent link described herein presents significant advantages in noise figure and dynamic range over prior art systems, especially when the optical loss in the link is more than a few decibels. It may find application in commercial telecommunications applications, such as CATV, satellites and remote antennas, and in military applications such as electronic warfare.

For example, the overall power gain may be defined to be the ratio of $I^2 R_l$ for one of the frequency components at the detector load to $V^2/R_m$ at the input to the modulator 58. Under these conditions the total gain for the coherent link is, $$G_{tot} = \left[G_{pre}R_d R_m \left[\frac{I_0}{2V_\pi}\eta_m\eta_1\pi r_d\right]^2\right]\left[\frac{I_{lo}G_{opt}}{I'_0\eta_1\eta_m}\right] \quad (1)$$

Where:
$G_{opt}$ is the gain of the optical amplifier,
$I_{lo}$ is the power of the local oscillator at the detector,
$I_o$ is the laser power input to the modulator for an incoherent system,
$\eta_1$ is the loss in the optical cable,
$\eta_m$ is the loss in the modulator,
$I'_o$ is the laser power input to the modulator for suppressed carrier system,
$r_d$ is detector responsivity,
$V_\pi$ is the modulation voltage required for $\pi$ phase shift,
$R_d R_m$ are impedance values for the detector and modulator, and
$G_{pre}$ is the preamplifier gain.

This equation is deliberately organized to be in the form, $$G_{tot} = (G_{inc})\left[\frac{I_{lo}G_{opt}}{I'_0\eta_1\eta_m}\right], \quad (2)$$

where $G_{inc}$ is the gain of an incoherent, prior art link with equivalent components, $$G_{inc} = G_{pre}\left[\frac{I_0}{2V_\pi}\eta_m\eta_1\pi r_d\right]^2 R_d R_m. \quad (3)$$

In a system that does not suppress the carrier (incoherent systems) the carrier component saturates the photodetector at high power levels. A practical limitation is thus imposed on $I_o$. The detected signal is proportional to $I_o(\pi/V_\pi)$. When the carrier is suppressed ($I'_o \gg I_o$) this limitation is eliminated and much larger $I_o$ can be used. This effectively increases the signal strength at the detector. This translates into a larger link gain $G_{tot}$, higher dynamic range, and lower noise figure.

The system herein may be used with radio frequency signals that are frequency division multiplexed. The multiplexed frequencies may be separated by intermediate frequency selection. By way of explanation, suppose two signals of 1 GHz bandwidth are frequency multiplexed on to the same optical beam separated by a 3 GHz guard channel. The bandwidth of the detector need only be 1 GHz centered at a convenient intermediate frequency, such as 2 GHz. Using the upper sideband information, the low frequency signal can be chosen by placing the local oscillator frequency 2 GHz below the lowest frequency signal. The other signal, being 3 GHz higher is 5 GHz higher in frequency relative to the local oscillator and would produce a corresponding intermediate frequency. The bandwidth of the detector would reject the second signal.

This method may also be used to de-multiplex signals generated on different optical beams and combined in the same fiber for transmission. In this event, the relative frequency of the multiple lasers must be offset to provide the frequency offsets of the various signals.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A system for conveying a signal by optical fiber that has been received on a radio frequency, the system comprising:
    means for providing a carrier suppressed optical frequency carrier having a sideband modulated by the signal;
    an optical amplifier for amplifying the modulated sideband before transmission on an optical fiber by at least approximately the same amount as the transmission loss; and
    a local oscillator and coupler for converting the modulated sideband from the optical fiber to a predetermined intermediate radio frequency.

2. The system of claim 1 wherein said means for providing the carrier suppressed optical frequency carrier comprises means for providing double sidebands thereof.

3. The system of claim 2 wherein said means for providing the suppressed carrier optical frequency carrier comprises a Mach-Zehnder interferometer modulator.

4. The system of claim 1 further comprising an optical bandpass filter for suppressing an image of the intermediate radio frequency in the modulated sideband.

5. The system of claim 4 wherein-said filter comprises a Mach-Zehnder interferometer.

6. The system of claim 1 wherein said means for providing the optical frequency carrier comprises means for providing a single sideband thereof.

7. A system for conveying a signal by optical fiber that has been received on a radio frequency, the system comprising:
    a laser for providing an optical frequency carrier;
    an electro-optic modulator for modulating the signal on a double sideband, carrier suppressed version of the optical frequency carrier; and
    an optical amplifier for amplifying the double sidebands of the modulated optical frequency carrier before conveyance on an optical fiber.

8. The system of claim 7 further comprising a tunable laser local oscillator and coupler for converting the amplified double sidebands conveyed on the optical fiber to a predetermined intermediate radio frequency.

9. A system for conveying a signal by optical fiber that has been received on a radio frequency, the system comprising:
    a laser for providing an optical frequency carrier;
    a Mach-Zehnder interferometer modulator for suppressing the optical frequency carrier and for modulating the signal on the double sidebands of the optical frequency carrier;
    an optical amplifier for amplifying the modulated double sidebands before transmission on an optical fiber by approximately the same amount the carrier was suppressed;
    an optical bandpass filter for suppressing an image of the intermediate radio frequency in the double sidebands conveyed by the optical fiber; and
    a laser local oscillator and coupler for converting the double sidebands conveyed by the optical fiber to a predetermined intermediate radio frequency.

10. A method of conveying a signal by optical fiber that has been received on a radio frequency, the method comprising the steps of:
    (a) modulating a sideband of a carrier suppressed optical frequency carrier with the signal;
    (b) amplifying the modulated sideband before transmission on an optical fiber by approximately the same amount the carrier was suppressed; and
    (c) converting the modulated sideband received on the optical fiber to a predetermined intermediate radio frequency.

* * * * *